Patented July 31, 1934

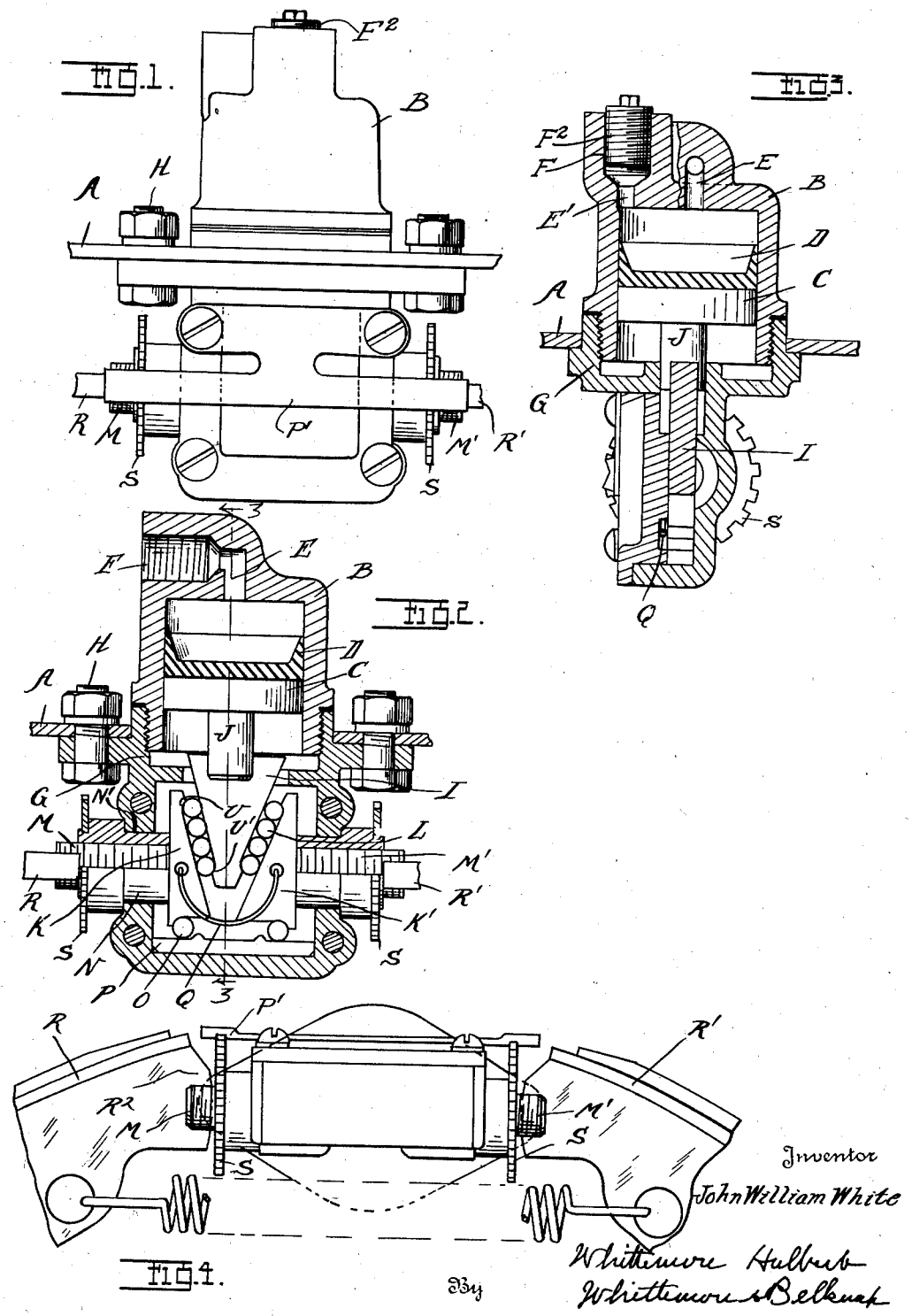

1,968,667

UNITED STATES PATENT OFFICE 1,968,667

HYDRAULIC BRAKE

John William White, Detroit, Mich.

Application March 21, 1932, Serial No. 600,273

4 Claims. (Cl. 188—152)

The invention relates to hydraulically operated vehicle brakes and has for its object the obtaining of a construction which is more conveniently applied to the brake mechanism. In the present state of the art it is usual to place the hydraulic cylinder for actuating the brake shoes inside of the brake drum. However, with front wheel brakes where the king pin is within the drum, the space within which the cylinder may be located is quite limited. This is particularly true where the size of the drum is small and in some designs there is no available space for a cylinder and double acting piston. Furthermore, the heat developed within the drum by the application of the brakes may be sufficient to volatilize certain constituents of the hydraulic fluid so as to render the brake temporarily inoperative.

With the present invention the hydraulic cylinder is located outside of the brake drum and the movement of the piston within this cylinder is transmitted to the brake shoes through mechanism located within the drum. This mechanism occupies much less space than required for a cylinder with double acting piston so that it can be conveniently installed in small size brake drums.

The invention therefore consists in the peculiar construction as hereinafter set forth.

In the drawing:

Figure 1 is a plan view;

Figure 2 is a horizontal section in the plane of the axis of the cylinder;

Figure 3 is a cross section on line 3—3 of Figure 2;

Figure 4 is a front elevation.

A is the brake head or carrier for the brake shoes and actuating mechanism, B is a hydraulic cylinder having its axis transverse to the plane of the carrier A and preferably perpendicular thereto. This cylinder contains a slidable piston C which is actuated and sealed by a cup D. The outer end of the cylinder is closed but is provided with an inlet passage E for the hydraulic fluid, which passage connects with a threaded socket F for connection with the flexible conduit or hose, a second threaded socket F' connected by a port E' with a cylinder is normally closed by a plug $F^2$ which when loosened provides a bleed for the cylinder, permitting escape of air. The inner end of the cylinder is open and extends through an aperture in the carrier A being connected to a housing G on the inner side of said carrier to be within the brake drum. As shown, the housing G is secured to the cylinder B by a threaded engagement and both parts are secured to the carrier A by clamping bolts H.

Within the housing G is a wedge I which is coupled to the stem J of the piston C. This wedge is arranged between a pair of heads K and K' which also are wedge shaped and have faces parallel to the faces of the wedge. Between the wedge and these parallel faces are series of rollers L which when the wedge is moved downward will react upon the heads K and K' forcing the same in opposite directions. These heads K and K' abut against plunger shanks M and M' having a threaded engagement with the bushings N which slidably engage bearings N' in the housing G. There are also rollers O interposed between the inner ends of the heads K K' and a bearing plate P which is parallel to the axis of the shanks M said rollers supporting said heads, which latter are also held from turning by the cheek plates $K^2$ on opposite sides thereof. Thus inward movement of the piston C will force the wedge between the heads K and K', the rollers L reducing frictional loss to the minimum. The rollers O take the lateral thrust upon the heads K and K' so that practically all the power of the piston is transmitted to the shanks M to move the same in opposite directions. When the piston C is moved outward the wedge is withdrawn and the heads K and K' are moved towards each other by a spring Q.

The mechanism thus far described is located within the drum (not shown) between the movable ends of the brake shoes R and R'. The shanks M engage the web portions $R^2$ of these shoes and adjustment to compensate for wear in the brake linings may be effected by a rotative adjustment of the sleeve or bushing N on the threaded shanks M and M'. A notched or knurled disk S is secured to the sleeve for rotative adjustment of the same and a spring arm P' engages these notches to hold the sleeve from accidental rotation. Thus when the sleeve is adjusted the effective length of the spacer between the shoe and the member K is increased.

In operation, the single piston B is used to actuate both of the brake shoes. If one of these shoes is subjected to greater wear than the other, as is usually the case, the inclination of the surface on one side of the wedge may be at a greater angle than that of the angle on the other side. This will result in a correspondingly greater adjustment of the shoe on one side than on the other which will compensate for unequal wear without tendency to move the piston out of alignment with the axis of the cylinder.

To prevent the rollers L and O from becoming displaced, shoulders U U' are formed on the wedge and on the heads K K' which will always restore the rollers to a fixed position when the piston C is at the outward limit of its movement. A similar construction may be used in connection with the rollers O.

What I claim as my invention is:

1. The combination of a brake carrier and brake shoes mounted thereon, of an hydraulic cylinder mounted on the outer face of said carrier with its axis extending transverse to the plane thereof, a piston in said cylinder, a casing mounted on the inner face of said carrier, slidable plungers in said casing for engaging the respective brake shoes, a wedge intermediate said plungers operated by the inward movement of said piston and anti-friction means between said wedge and said plungers, and a friction means between said plunger and casing for receiving the lateral thrust of the wedge.

2. The combination with a brake carrier and brake shoes mounted thereon, of an hydraulic cylinder mounted on the outer face of said carrier with its axis extending transverse to the plane thereof, a piston in said cylinder, a casing mounted on the inner face of said carrier in alignment with said cylinder, plungers for engaging the respective shoes slidable in said casing, a wedge intermediate said plunger operatively connected to the said piston, heads on said plungers having faces parallel to the adjacent faces of said wedge, anti-friction rollers between said wedge and said heads and anti-friction means between said heads and casing for receiving the lateral thrust of the wedge with a minimum of resistance to movement of said plunger.

3. The combination with a brake carrier and brake shoes mounted thereon, of an hydraulic cylinder mounted on the outer face of said carrier and extending through an aperture therein, a casing mounted on the inner face of said carrier and connected to said cylinder, a piston in said cylinder, aligned plungers in said casing respectively engaging said brake shoes, a wedge connected to said piston extending between said plungers, anti-friction bearings between said plungers and said casing for receiving the thrust of said wedge.

4. The combination with a brake carrier and brake shoes mounted thereon, of an hydraulic cylinder mounted on the outer face of said carrier, a casing mounted on the inner face of said carrier, said cylinder and casing being connected to each other through an aperture in said carrier to form a rigid unit, a piston in said cylinder, a wedge connected to said piston located in said casing, wedges in said casing on opposite sides of the piston wedge, roller bearings between said piston wedge and the wedges on opposite sides thereof, roller bearings between said wedges and said casing for receiving the lateral thrust of said piston wedge, plungers slidable in said casing and bearing against the wedges therein, extensions of said plungers having a threaded engagement therewith and having their outer ends engaging said shoes, and means for rotatively adjusting said plungers to increase the distance between said shoes and wedges to compensate for brake lining wear.

JOHN WILLIAM WHITE.